(12) United States Patent
Skotty

(10) Patent No.: US 9,115,792 B2
(45) Date of Patent: Aug. 25, 2015

(54) CONVERTING THE SPEED AND TORQUE OF A MOTOR

(75) Inventor: Brian Roy Skotty, Elmhurst, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 611 days.

(21) Appl. No.: 13/485,219

(22) Filed: May 31, 2012

(65) Prior Publication Data

US 2013/0324351 A1    Dec. 5, 2013

(51) Int. Cl.
*F16H 57/08* (2006.01)
*F16H 1/46* (2006.01)
*F16H 1/28* (2006.01)

(52) U.S. Cl.
CPC .. *F16H 1/46* (2013.01); *F16H 1/28* (2013.01); *F16H 57/082* (2013.01)

(58) Field of Classification Search
CPC ............ F16H 1/28; F16H 1/46; F16H 57/082
See application file for complete search history.

(56) References Cited

U.S. PATENT DOCUMENTS

| | | | |
|---|---|---|---|
| 3,254,450 A | 6/1966 | Schneider | |
| 4,392,396 A * | 7/1983 | Sato et al. | 475/343 |
| 6,401,792 B1 | 6/2002 | Mullet et al. | |
| 2006/0293142 A1 * | 12/2006 | Torres et al. | 475/331 |
| 2010/0319257 A1 | 12/2010 | Taheri et al. | |

* cited by examiner

*Primary Examiner* — Derek D Knight
(74) *Attorney, Agent, or Firm* — Fitch Even Tabin & Flannery LLP

(57) ABSTRACT

A method and apparatus converts the speed and torque of a motor output and couples the adjusted output to a device or structure, such as a movable barrier. In one example, a conversion apparatus includes a first gear set, a second gear set, a third gear set, and a fourth gear or ring gear. The first gear set may engage a motor output and receive rotational input therefrom. The rotational input is transferred from the first to the second gear set and then to the third gear set, which may engage a ring gear. In one configuration, a carrier is disposed about the gear sets. Carrier fasteners may extend through openings in the third gear set and, as the third gear set travels around the ring gear, the carrier fasteners may revolve around a central axis and rotate a carrier output shaft.

24 Claims, 11 Drawing Sheets

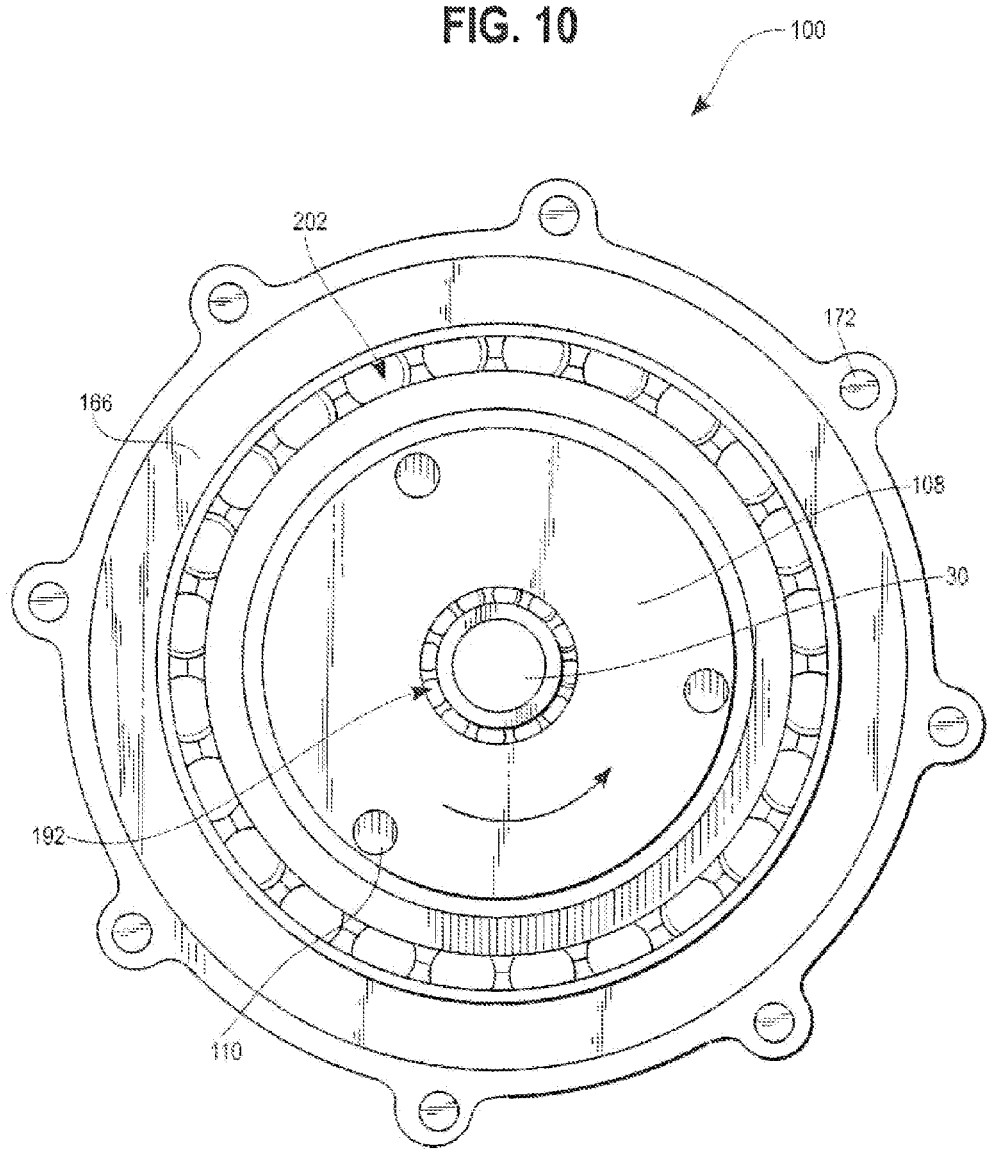

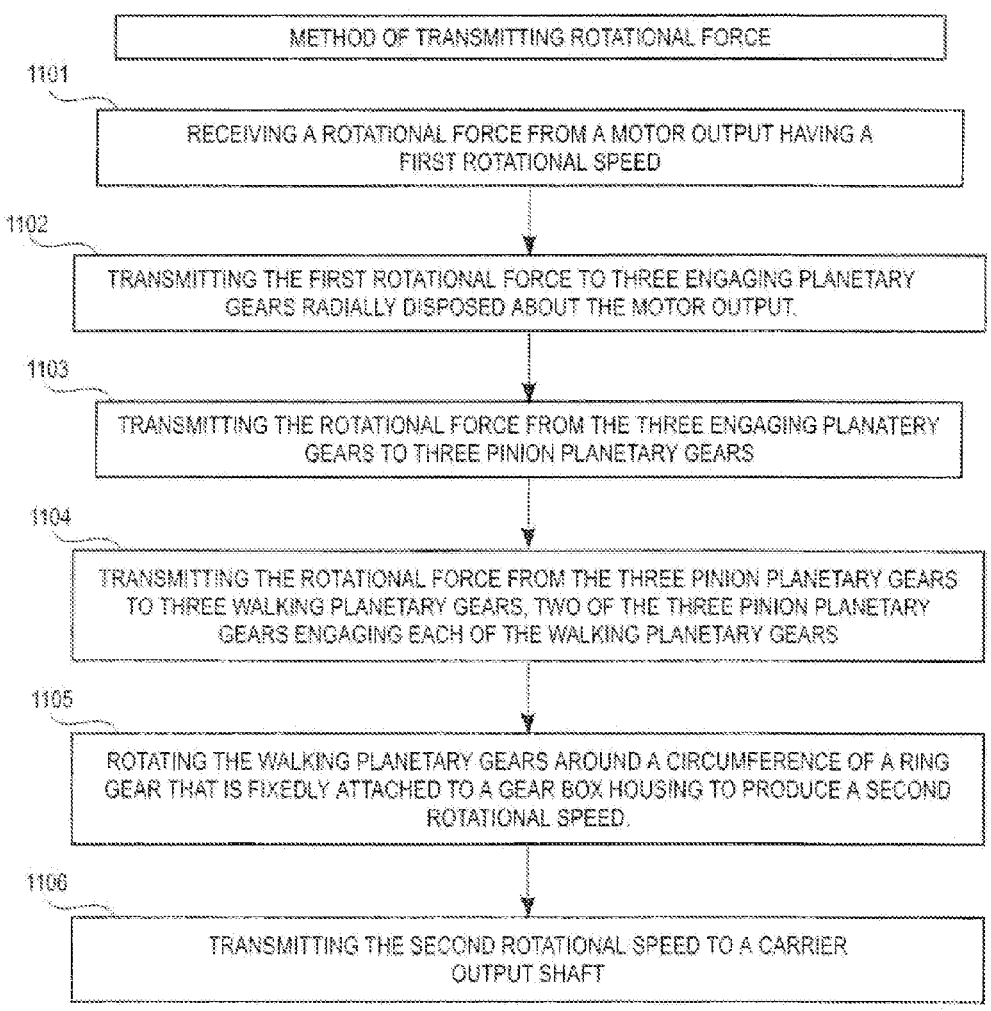

CONVERTING THE SPEED AND TORQUE OF A MOTOR

TECHNICAL FIELD

This invention relates generally to an apparatus, such as a gearbox, and methods for converting the speed and torque of a motor output.

BACKGROUND

Motors, such as electric motors, are typically designed to convert one particular type of energy into useful mechanical energy and may be employed to assist with any of a number of operations. Such devices may be employed with, for example, household appliances, power tools, turbines, pumps, machine tools, and many other devices for many other applications.

A motor output often needs to be adjusted for a given application. Thus, a gearbox or transmission may be used to transmit, adjust, or convert the speed, torque, and sometimes the direction of a motor output for use with a given device or application. More particularly, the output of a gearbox may rotate at a slower or faster rate than the input, and such a rotational change is accompanied by a corresponding increase or reduction in torque.

To provide effective and reliable adjustment of the motor output, gearboxes typically are designed to be durable. Such durability, however, can make the gearboxes bulky and awkward, especially for certain applications. Further, because gearboxes are used for such a wide variety of disparate applications, a gearbox suited for one application may not be interchangeable with or easily adaptable to a different application. Thus, a desired gearbox may not be readily available for a specific application.

By way of one example, barrier movement operators, which provide secure access to buildings or areas, generally comprise power and control systems for responding to operator inputs and sensed conditions. Operators thereby move barriers, such as garage doors or sliding gates, between open and closed positions. Various systems for operating and controlling movable barriers have been employed.

In some barrier installations, the barriers are quite large and heavy, thereby requiring significant energy to move the barrier from its respective open and closed positions. In other barrier installations, the barriers may be lightweight and/or small. Nonetheless, such barriers are often installed in structures that lack much extra space for the power and control systems. Thus, a gearbox with the ability to produce high conversion ratios in a very compact space is needed to produce high torque applications in a small space.

SUMMARY

Generally speaking, and pursuant to these various embodiments, apparatuses and methods are described herein that provide for converting the speed and torque of a motor output and applying or coupling that adjusted output to a device or structure, such as a movable barrier. As used herein, the motor output is used as an input drive to a conversion apparatus or gearbox. In one example, an apparatus for converting speed and torque includes a first gear set, a second gear set, a third gear set, and a fourth gear or annulus gear. In one aspect, the first gear set or first stage gears have external gear teeth configured to engage a motor output and receive a rotational input therefrom. The first stage gears also engage and rotate the second gear set or second stage gears. The third gear set or third stage gears may have external gear teeth and an internal opening, which may be centrally disposed. In this example, the annulus gear has internal gear teeth engaging the external third stage gear teeth.

In one configuration, the apparatus includes a carrier with an output section or shaft with a flange and a carrier plate with an opening through which the motor output may extend. The flange and the carrier plate may have openings, which are configured to receive carrier fasteners. In one aspect, the carrier fasteners extend through radially-disposed openings in the flange, through the third stage gear openings, and into the radially-disposed openings of the carrier plate. In operation, the external third stage gear teeth engage the internal gear teeth of the annulus gear such that the third stage gears are configured to travel or walk around the annulus gear thereby rotating the carrier, which is rotatably secured thereto via the carrier fasteners that extend through the third stage openings. Alternatively, one of ordinary skill in the art may, based on these teachings, configure the third stage gears to rotate in position such that the annulus gear is rotated therearound. In such a configuration, the carrier would be secured to the annulus gear and rotate therewith while the annulus gear would rotate relative to the gear housing.

In another illustrative example, an apparatus, such as a gearbox, includes three engaging planetary gears, three pinion planetary gears, three walking planetary gears, and a ring gear. In addition, a carrier with an output shaft, a carrier plate, carrier fasteners, and gear housing may be employed with the gears. Here, the three engaging planetary gears engage an input drive, such as a motor output. The three engaging planetary gears also engage and rotate the three pinion planetary gears, which in turn rotate the three walking planetary gears. The walking planetary gears have teeth that engage the gear teeth disposed on an inner surface of the ring gear. An output shaft with a flange and a carrier plate are connected on either side of the gears via a set of carrier fasteners that extend through apertures of the flange and the carrier plate. The carrier fasteners also extending through a central opening in the walking planetary gears.

In another aspect, a method for transmitting rotational force includes receiving a rotational force from a motor output having a first rotational speed and transmitting the first rotational force to three engaging planetary gears radially disposed about the motor output. This example method includes transmitting rotational force from the three engaging planetary gears to three pinion planetary gears. Rotational force is further transmitted from the three pinion planetary gears to three walking planetary gears by having two of the three pinion planetary engage each of the walking planetary gears. By one approach, transmitting the rotational force to the walking planetary gears moves the gears around a circumference of the ring gear, which is fixedly attached to a gearbox housing. Further, carrier fasteners extend from the carrier through openings in the walking planetary gears and move therewith. Thus, the carrier shaft, which is operably connected to the walking planetary gears, is rotated by the movement of the carrier fasteners. This configuration transmits the second rotational speed to the carrier shaft output. In one approach, the second rotational speed is lower than the first rotational speed.

So configured, given apparatuses and methods can convert the speed and torque of a motor in a robust manner and in less than ideal conditions, such as a confined space that would not readily accommodate a conventional, bulky gearbox. Such an apparatus may be conveniently and easily installed into a variety of spaces by having a smaller size. In addition, such a configuration accompanies a large rotational speed reduction and is nonetheless relatively small and light weight, due to the load sharing among numerous gear teeth. Further, such a configuration has increased efficiencies allowing it to deliver higher torque, while reducing power loss. In one configuration, the gearbox is fully back drivable at high reduction ratios. Further, in some configurations, some of the gears, such as the pinion and idler gears, are interchangeable to create numerous reductions ratios without changing any other components, thereby allowing for a very versatile design to accommodate numerous applications.

Though illustrative examples are provided herein with reference to a movable barrier operator for providing controlled access to a given space, the attributes may be applied to other settings such as gearboxes or transmissions for pumps, power tools, and fans, to note but a few additional applications.

BRIEF DESCRIPTION OF THE DRAWINGS

The above needs are at least partially met through provision of the apparatus and methods for converting the speed and torque of a motor described in the following detailed description, particularly when studied in conjunction with the drawings, wherein:

FIG. 10 comprises a back plan view of the example apparatus of FIG. 3; and

FIG. 11 comprises a flow chart of an example method of operation as configured in accordance with various embodiments of the invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments. Also, common but well-understood elements that are useful or necessary in a commercially feasible embodiment are often not depicted to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Figure 1:
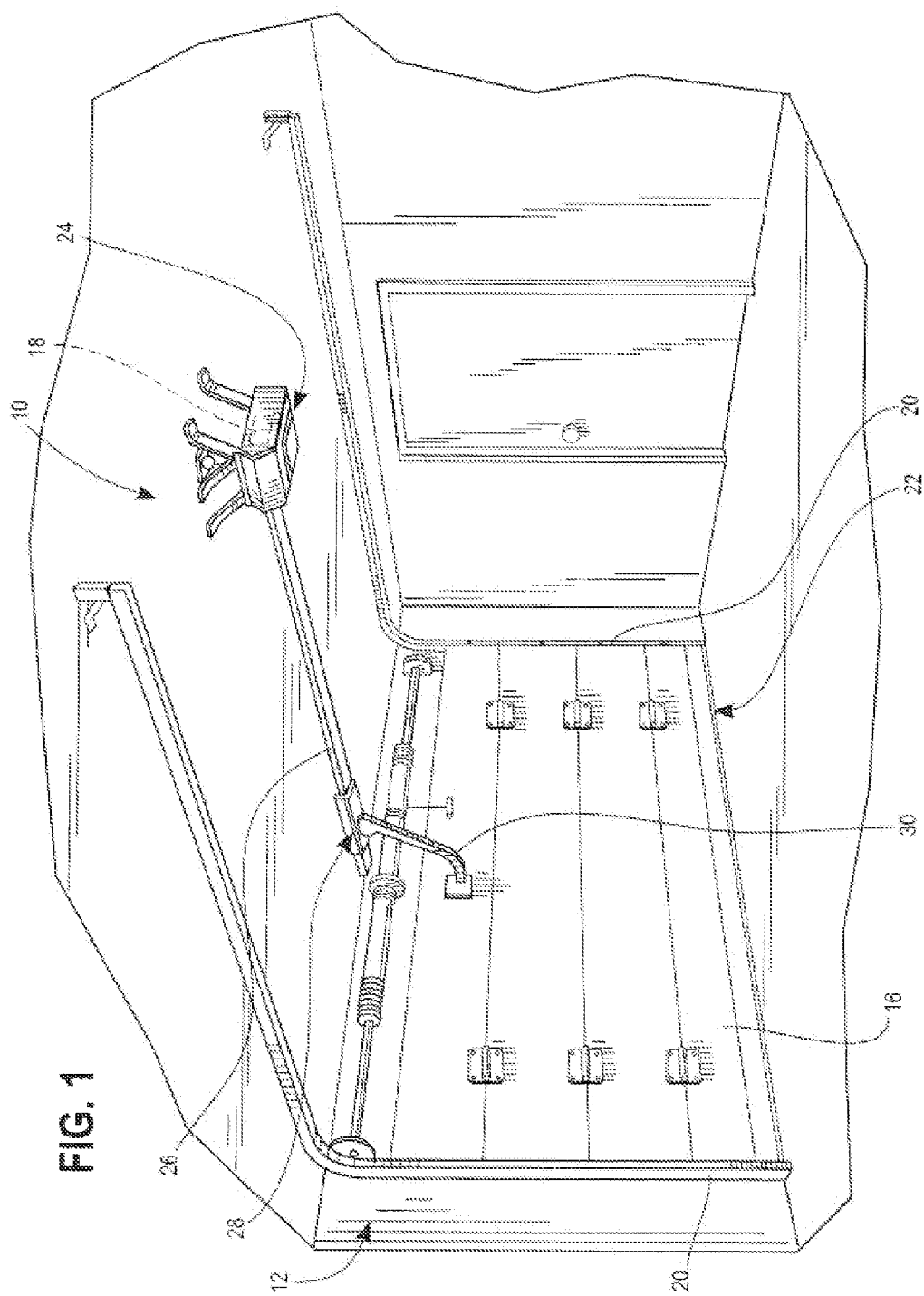
FIG. 1 comprises a perspective view of an inside of a garage with a movable barrier as configured in accordance with various embodiments of the invention.

Referring now to the drawings, and in particular to FIG. 1, a movable barrier operator 10 illustrates an exemplary application of a conversion apparatus 100. The movable barrier operator 10, as illustrated, is located within a parking structure or garage 12 and is configured to control movement of a movable barrier 16. In one approach, the movable barrier 16 is a multi-panel garage door having portions that ride within a pair of L-shaped tracks 20 positioned adjacent to and on opposite sides of a garage opening 22. An overhead unit 24, which is disposed adjacent a rail assembly 26, houses a motor 18 that operates to move the movable barrier 16. The rail assembly 26 includes a trolley 28 for releasable connection of the head unit 24 via arm 30. For example, the arm 30 may be connected to an upper portion of the movable barrier 16 and the trolley 28 may be connected to the drive chain, which is driven by a sprocket operably connected to the motor 18 in the head unit 24.

Figure 2:
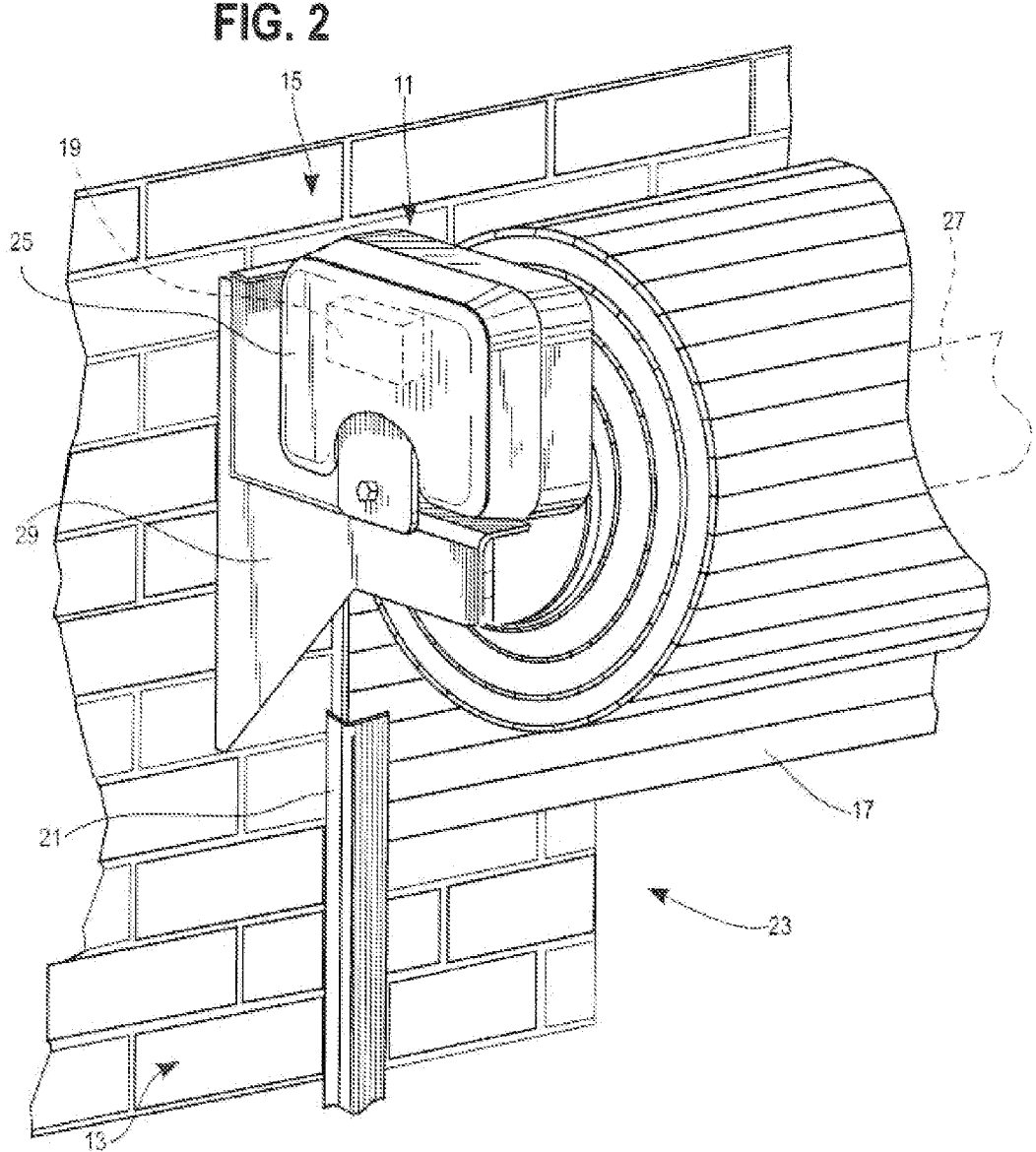
FIG. 2 comprises a partial perspective view of another movable barrier as configured in accordance with various embodiments of the invention.

Another exemplary application, illustrated in FIG. 2, includes a shaft-mounted movable barrier operator 11 that is mounted inside the garage 13 on a wall 15 immediately above an opening 23, which is closed by movable barrier 17. In this application, the movable barrier 17 is supported by the shaft 27, which is supported at the ends by a door mount 29. A motor 19 is disposed within the housing 25 of the movable barrier operator 11. Typically, a set of wheels (not shown) are disposed on the shaft 27 and, as the wheels are rotated, the movable barrier 17 winds and unwinds around the shaft 27. Further, ends of the movable barrier 17 ride within tracks 21 positioned adjacent to the sides of the garage opening 23.

For both illustrative movable barrier installations, a movable barrier operator 10, 11 includes a motor 18, 19 operably connected to the movable barrier 16, 17. The motor 18, 19 may be positioned within the head unit 24 or motor housing 25. The motor 18, 19 may operably connect to a drive chain, a jackshaft operator, a trolley-type connector, or a shaft and associated wheels, among others. By one approach, the motor 18, 19 has a motor output 30 that engages a conversion apparatus 100, which then operably connects to the movable barrier 16, 17. Such a conversion apparatus 100 may be used in applications where the motor output needs to be transmitted, adjusted, or converted for use with a given application or device.

Figure 3:
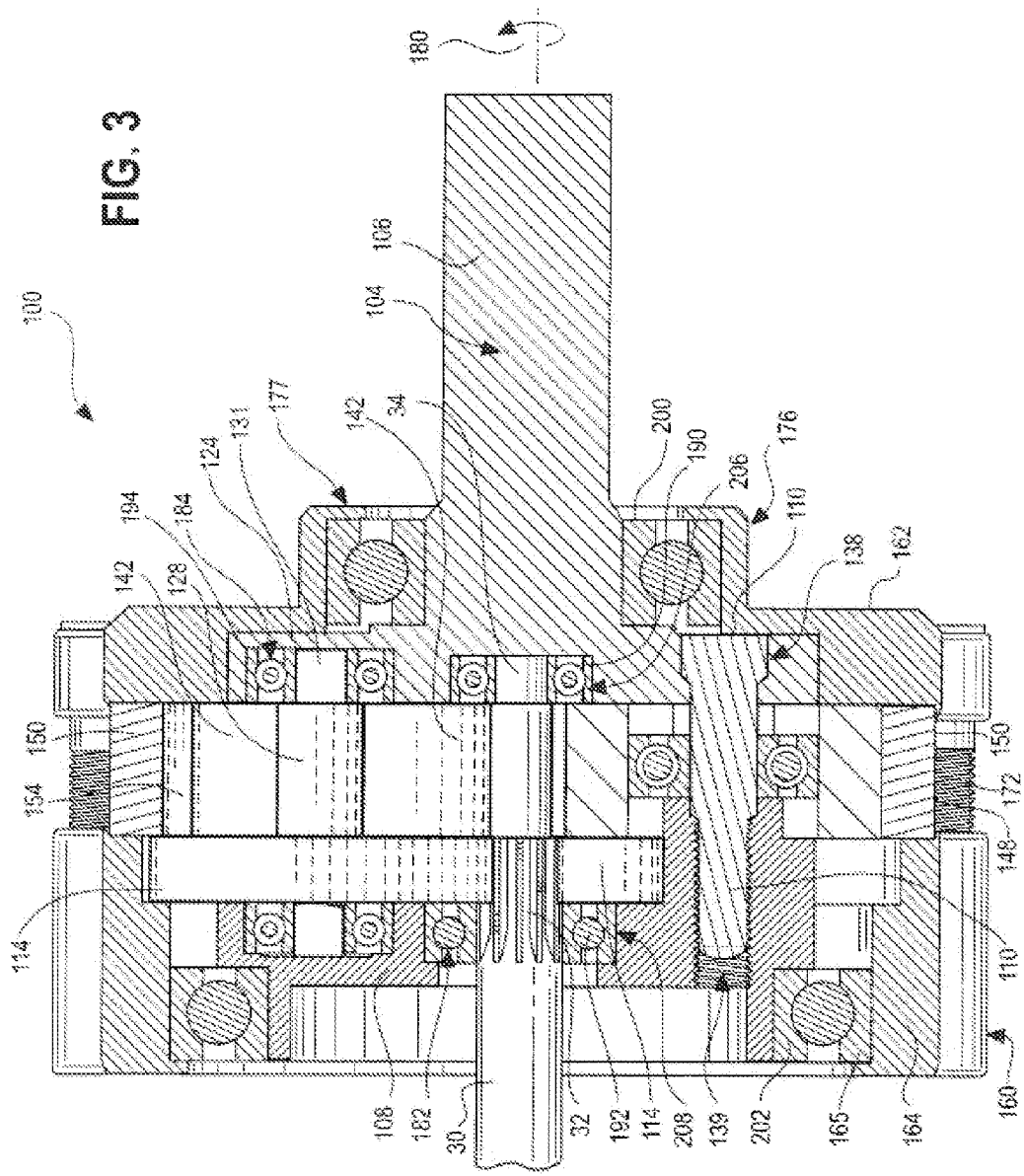
FIG. 3 comprises a schematic cross sectional view of an example apparatus with some gear teeth shown in dashed lines to better facilitate understanding of the structure.
Figure 4:
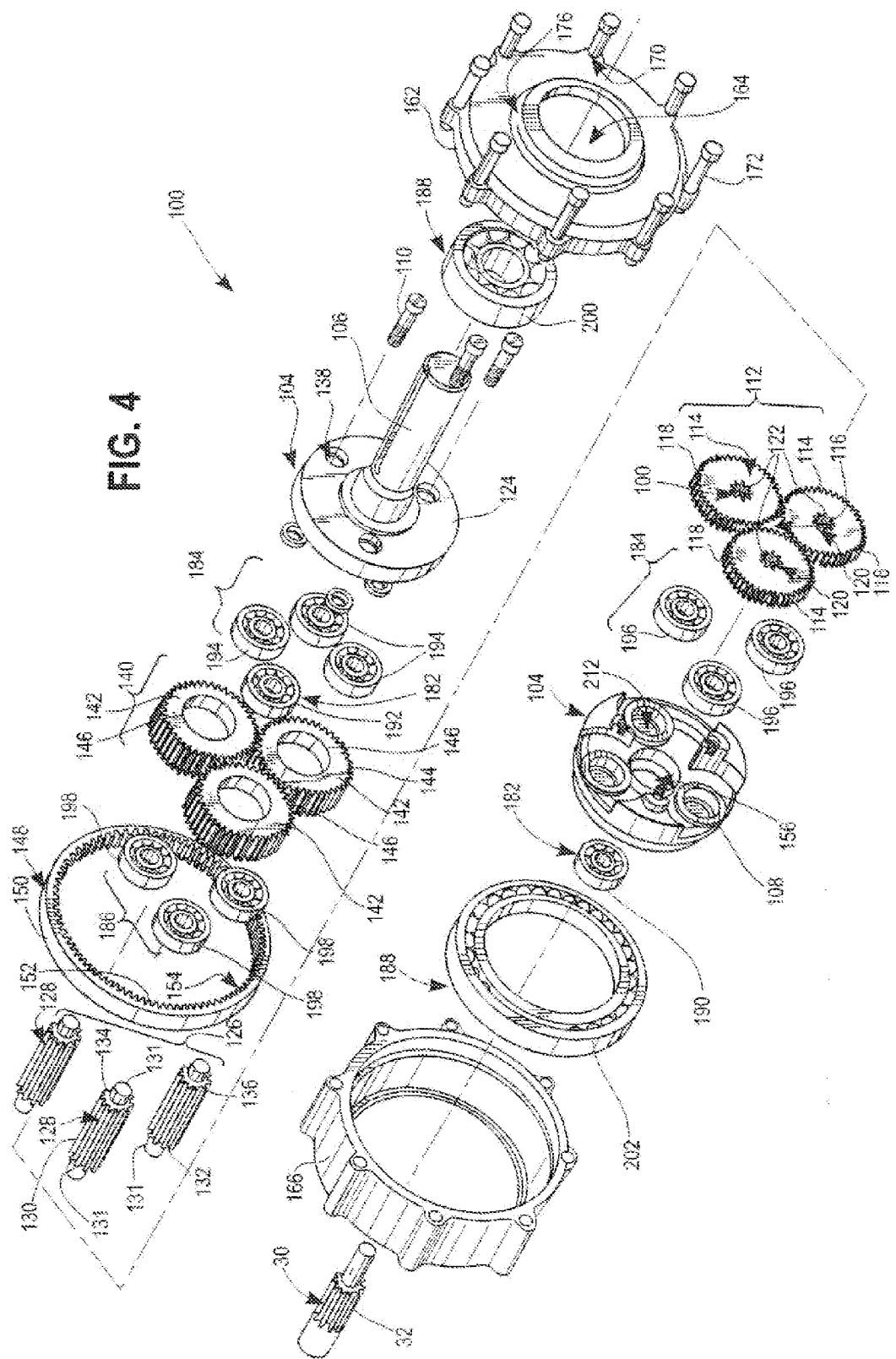
FIG. 4 comprises an exploded, rear perspective view of the example apparatus of FIG. 3.
Figure 5:
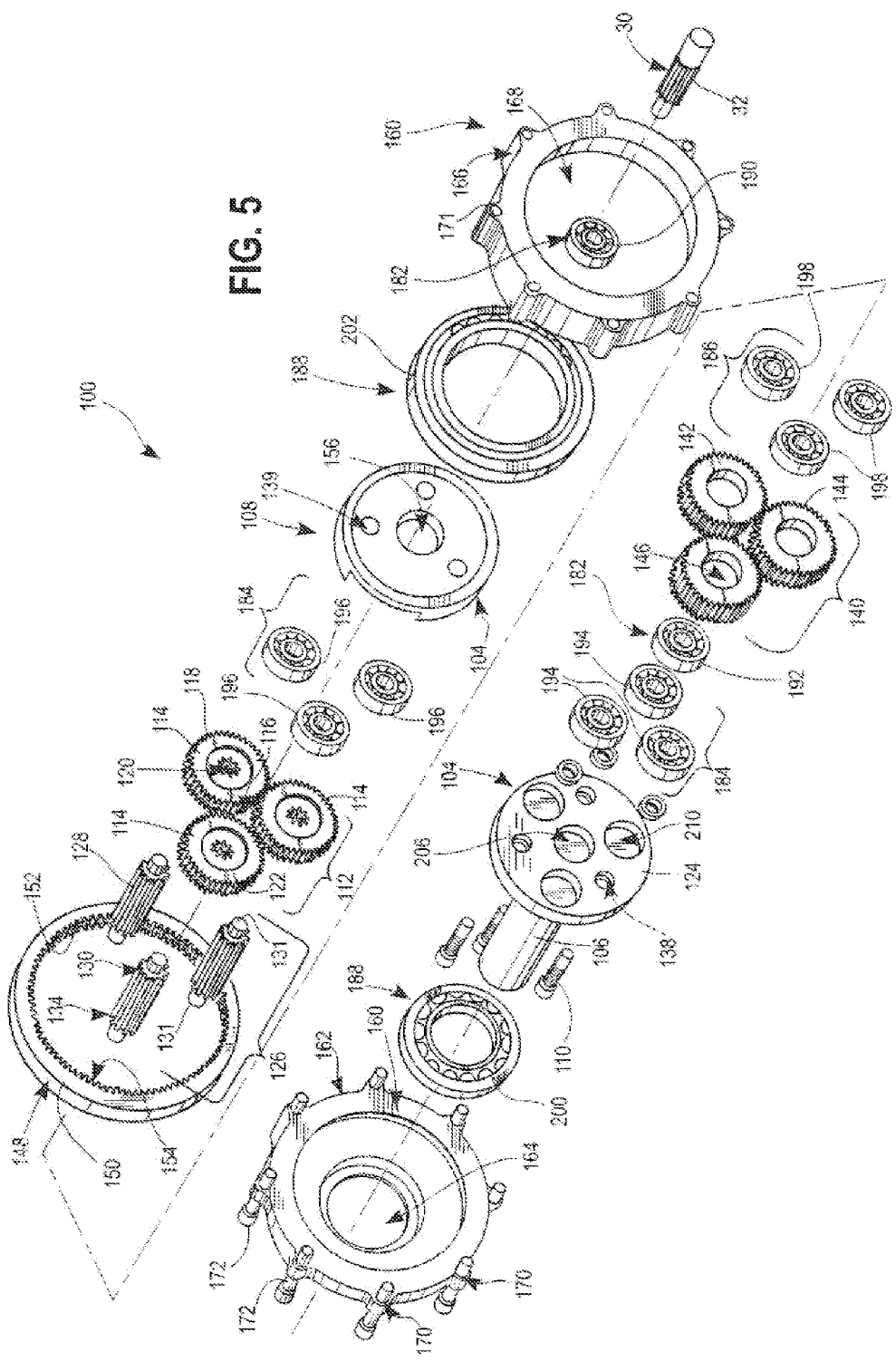
FIG. 5 comprises an exploded, front perspective view of the example apparatus of FIG. 3.
Figure 6:
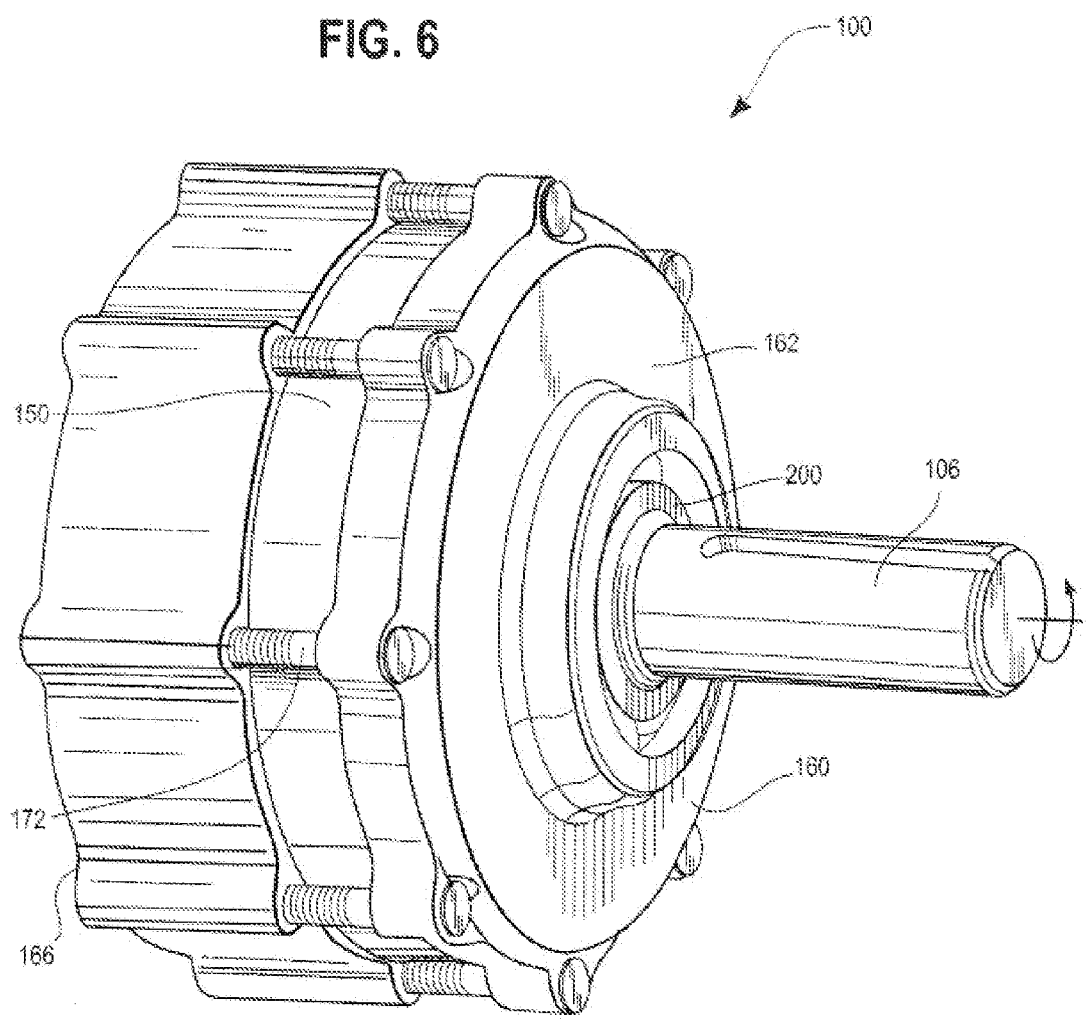
FIG. 6 comprises a front perspective view of the example apparatus of FIG. 3.

FIGS. 3-5 illustrates one example of the conversion apparatus 100 operably connected to a motor output shaft 30. In operation, the conversion apparatus 100 converts or adjusts a first rotational speed of the motor output shaft 30 to a second rotational speed of a carrier output shaft 106. By one illustrative approach, the second rotational speed is lower than the first rotational speed.

The conversion apparatus 100 of FIGS. 3-10 engages an input drive such as the motor output shaft 30 by engaging gear teeth 32 disposed thereon. The conversion apparatus 100 includes a first gear set 112 including, for example, three engaging planetary gears 114 that are radially disposed about a central opening 116 through which the motor output shaft 30 extends. The engaging planetary gears 114 have gear teeth 118 externally disposed thereon, which engage with the gear teeth 32 of the motor output shaft 30 thereby transferring rotational force from the motor output shaft 30 to the engaging planetary gears 114. Each of the engaging planetary gears 114 also defines a central opening 120 disposed therein (FIG.

5). By one approach, the central opening 120 of the engaging planetary gears 114 have internal gear teeth 122 disposed therein.

A second gear set 126 engages the first gear set 112 to be rotated therewith. The second gear set 126 includes, for example, three pinion planetary gears 128. By one approach, the pinion planetary gears 128 include a first portion 130 that engages one of the engaging planetary gears 114. In the illustrated example, the first portion 130 of the pinion planetary gears 128 engages the central opening 120 of the engaging planetary gears 114 such that the first gear set 112 rotates the second gear set 126. As illustrated, the first portion 130 of the pinion planetary gears 128 includes gear teeth 132 that engage the internal gear teeth 120 of the engaging planetary gears 114 such that rotation of the engaging planetary gears 114 rotates the pinion planetary gears 128 via the operable connection between gear teeth 132 and 120. Thus, each of the planetary engaging gears 114 of the first gear set 112 has a common rotational axis with the pinion planetary gears 128 of the second gear set 126.

The pinion planetary gears 128 have a width that is larger than the width of the engaging planetary gears 114. By one approach, the first portion 130 of the pinion planetary gears 128 has a width that is approximately equal to or slightly larger than the width of the engaging planetary gears 114. In this example, the pinion planetary gears 128 also have a second portion 134 that engages another gear set. Thus, the pinion planetary gears 128 may have a width that is approximately equal to or wider than the combined width of the two gear sets with which the pinion planetary gears 128 are engaged. In addition, the pinion planetary gears 128 have end portions 131 that extend beyond the combined width of the two gear sets. The end portions 131 engage bearings such that the pinion planetary gears 128 are rotatably engaged with a carrier described below.

A third gear set 140 engages the second gear set 126 to be rotated therewith. The third gear set 140 includes, in this, example three walking planetary gears 142. The walking planetary gears 142 have externally disposed gear teeth 144. By one approach, the second portion 134 of the pinion planetary gears 128 also includes gear teeth 136 that engage the externally disposed gear teeth 144 of the walking planetary gears 142 such that the second gear set 126 is configured to rotate the third gear set 140. In this example, each of the walking planetary gears 142 engages portions 134 of two pinion planetary gears 126. In operation, the rotational force is transferred to the walking planetary gears 142 via two points of engagement with the second gear set 126. The walking planetary gears 142 also have centrally disposed openings 146, which may have a bearing disposed therein as detailed below.

In addition to the pinion planetary gears 128, the external gear teeth 114 of the walking planetary gear 142 also engages with a fourth stage gear 148 such as an annulus or ring gear 150. The ring gear 150 has gear teeth 152 disposed on an inner surface 154 of the ring gear 150. The internal ring gear teeth 152 of the ring gear 150 engage the externally disposed gear teeth 144 of the walking planetary gears 142 such that the walking planetary gears 142 are configured to travel around the ring gear 150. In another aspect, one of skill in the art could use these teachings and configure the fourth stage gear 148 to rotate relative to the walking planetary gears 142, such that the walking planetary gears 142 would spin in position while the fourth stage gear 148 is rotated therearound. In such a configuration, the fourth stage gear 148 is not fixedly connected to the housing but rotates with the output carrier.

In the illustrated example, the ring gear 150 has a width that is approximately equal to the width of the gears of the third gear set 140. Further, the pinion planetary gears 128 of the second gear set 126 have a width that is at least as long as the combination of both the width of the first gear set 112 and the third gear set 140, in addition to the gear ends 131. More particularly, the width of the external gear teeth 132, 136 of the pinion planetary gears 128 may be approximately equal to the combination of the width of the internal gear teeth 122 of the planetary engaging gears 114 and the external gear teeth 144 of the walking planetary gears 142.

The conversion apparatus 100 further includes a carrier 104 with a carrier output shaft 106 and a carrier flange 124 and a carrier plate 108. The carrier plate 108 includes a centrally disposed through opening 156 through which the motor output shaft 30 may extend. The carrier flange 124 defines radially disposed apertures 138 therein, and the carrier plate 108 defines radially disposed apertures 139 therein, which may be threaded openings. The apertures 138, 139 typically align such that carrier fasteners 110 may extend from the apertures 138 of the carrier flange 124 to the apertures 139 of the carrier plate 108. The carrier fasteners 110 fixedly attach to the carrier flange 124 and the carrier plate 108 via a threaded screw connection such that the carrier 104 is fixedly secured together.

The carrier shaft 106 and flange 124 are disposed on one side of the gear sets 112, 126, 140 and the carrier plate 108 is disposed on the other side, as shown in FIG. 3. As illustrated, the carrier fasteners 110 that extend from apertures 138 to apertures 139 also extend through a central opening 146 in the walking planetary gears 142. The carrier fasteners 110 that are fixedly attached to the carrier flange 124 and the carrier plate 108 are rotatably connected via a bearing set to the walking planetary gears 142. As the walking planetary gears 142 travel around the ring gear 150, the carrier fasteners 110 extending through the central opening 146 of the gears 142 are revolved around a central axis 180. The carrier fasteners 110, fixedly secured to the carrier 104, rotate the carrier output shaft 106 as the carrier fasteners 110 revolve around the central axis 180. The carrier output shaft 106 is operably connected to drive a movable barrier 16, 17 such that the rotational output of the carrier output shaft 106 is transferred thereto. In one illustrative embodiment, the conversion apparatus 100 includes three carrier fasteners 110, each of which extends through one of the three walking planetary gears 142.

The ring gear 150 is disposed in between portions of a gear housing 160 including a front housing portion 162 having a central opening 164 and a rear housing portion 166 having a central opening 168. The front housing portion 162 includes a first set of apertures 170 and the rear housing portion 166 includes a second set of apertures 171. A set of housing fasteners 172 extends through the apertures 170, 171 to fixedly connect the front and rear housing portions 162, 166 to one another and to the ring gear 150. By one approach, there are eight housing fasteners 172 that extend from eight front housing apertures 170 to eight rear housing apertures 171.

The ring gear 150 is fixedly, frictionally secured between the front housing portion 162 on one side and the rear housing portion 166 on the other side due to the compression force created by the housing fasteners 172. The front housing portion 162, the rear housing portion 166, and the ring gear 150 are disposed around the first, second, and third gear sets 112, 126, and 140 and portions of the carrier 104. The carrier output shaft 106 extends through the front opening 164 in the housing 160, and the motor output shaft 30 extends through the rear opening 166. The housing 160 is typically anchored to a mount such that the gear housing 160 does not rotate but is stationary such that the carrier 104 rotates relative thereto. As the third gear set 140 rotates and engages the ring gear 150, which is fixedly attached to the gear housing 160, each of the walking planetary gears 142 moves or travels along the circumference of the ring gear 150 and rotates the carrier output shaft 106, which is rotationally connected to the third gear set gears via the carrier fasteners 110.

As mentioned, the example conversion apparatus 100 includes a number of ball bearing sets. In one illustrative example, the conversion apparatus 100 includes four sets of ball bearings: a first set 182 disposed along portions of the motor output shaft 30; a second set 184 disposed along portions of the second gear set 126; a third set 186 disposed adjacent portions of the carrier fasteners 110; and a fourth set 188 disposed adjacent portions of the gear housing 160.

By one approach, the first ball bearing set 182 includes a ball bearing 190 disposed in a central opening of the carrier flange 124 that engages an end 34 of the motor output shaft 30 and a ball bearing 192 disposed in a central opening of the carrier plate 108 that engage the motor output shaft 30. The first set of ball bearings 182 provides a rotatable engagement between the motor output shaft 30 and the carrier 104 including the carrier flange 124 and carrier plate 108. More particularly, the carrier 104 has ball bearing sets that engage the motor output shaft 30 at an end 34 thereof and at a mid-point of the motor output shaft 30.

The second ball bearing set 184 includes front carrier ball bearings 194 in radially disposed openings in the carrier flange 124 and rear carrier ball bearings 196 in radially disposed openings in the carrier plate 108. The second set of ball bearings 184 provides a rotatable engagement between the pinion planetary gears 128 and the carrier 104 including the carrier flange 124 and carrier plate 108 by having the ends 131 of the pinion planetary gears 128 engaging the front and rear carrier ball bearings 194, 196.

The third ball bearing set 186 include walking ball bearings 198 disposed within central openings 146 of the walking planetary gears 142 that receive the carrier fasteners 110. Though the carrier fasteners 110 are fixedly connected to the carrier flange 124 and carrier plate 108, the carrier fasteners 110 are rotatably engaged with the walking planetary gear 142 via the walking ball bearings 198.

In one example, the fourth ball bearing set 188 includes a front housing ball bearing 200 disposed between a front housing ridge 176 of the gear housing 160 and the carrier output shaft 106 and a rear housing ball bearing 202 disposed between the carrier plate 108 and the rear housing 166 at the rear housing opening 168. The front housing ridge 176 includes an inwardly directed flange 177 that cooperates with the carrier flange 124 to retain the front housing ball bearing 200 between the carrier flange 124 and the front housing 162. Further, the rear housing 164 also includes an inwardly directed flange 165 that cooperates with the carrier plate 108 to retain the rear housing ball bearing 202. The fourth set of ball bearings 188 provides a rotatable engagement between the carrier 104 and the gear housing 160.

As noted, the carrier 104 may include several openings, recesses, or cavities to accommodate the various ball bearing sets 182, 184, 188 the carrier fasteners 110, and the motor output shaft 30. In the illustrated example, to accommodate the first ball bearing set 182, the carrier flange 124 defines a centrally disposed cavity 206, and the carrier plate 108 defines a centrally disposed cavity 208 that is adjacent the centrally disposed through opening 156. To accommodate the second ball bearing set 184, the carrier flange 124 and carrier plate 108 define radially disposed cavities 210 and 212. More particularly, the carrier flange 124 defines in this example three radially disposed cavities 210, and the carrier plate 108 defines three radially disposed cavities 212 for the front and rear carrier ball bearings 194, 196 that accommodate the ends 131 of the pinion planetary gears 128. Further, the carrier flange 124 defines three radially disposed cavities 210, and the carrier plate 108 defines three radially disposed cavities 212 such that both ends of the pinion planetary gears 128 are engaged with the front and rear carrier ball bearings 194, 196 disposed in the cavities 210, 212. Thus, the ends 131 of the pinion planetary gears 128 are supported by a pair of ball bearing sets that are mounted in the carrier 10.

In addition, both the carrier flange 124 and the carrier plate 108 have radially disposed apertures 138, 139 for the carrier fasteners 110. At least the apertures 138 in the carrier flange 124 may be through openings, though the apertures 139 of the carrier plate 108 also may be through openings.

Figure 7:
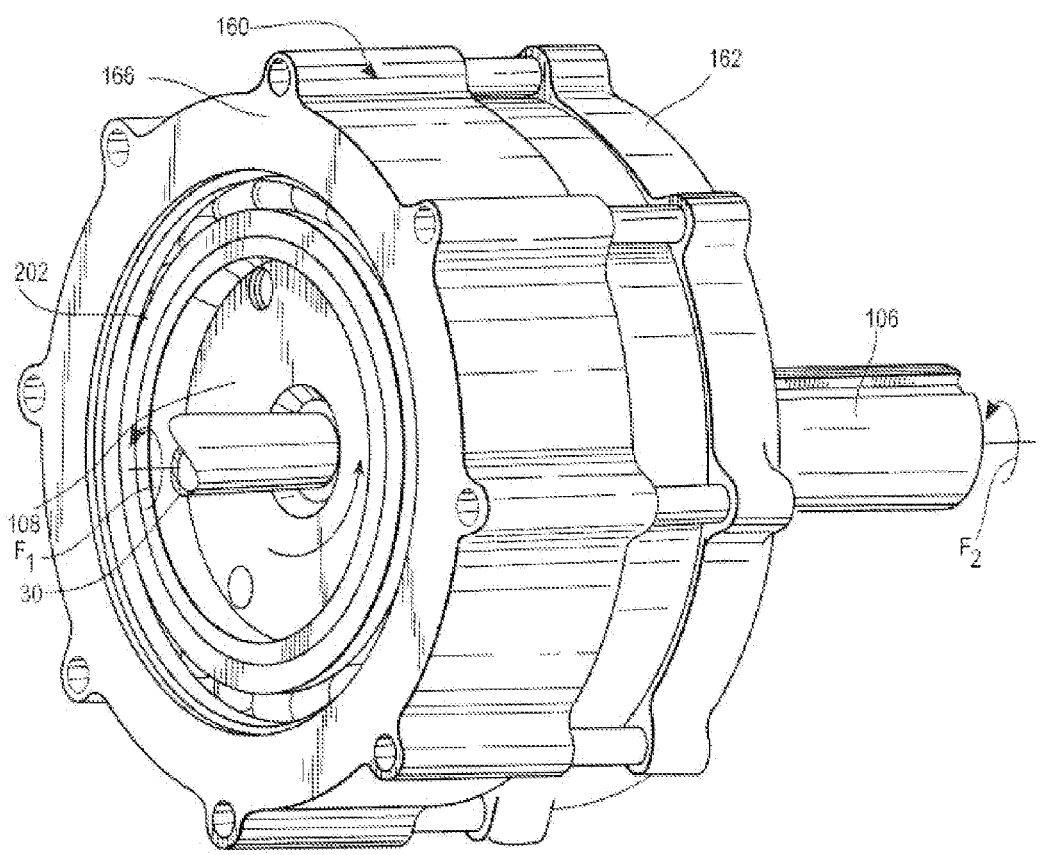
FIG. 7 comprises a rear perspective view of the example apparatus of FIG. 3 with a motor input shaft engaging therewith as configured in accordance with various embodiments of the invention.

A method 1100 of transmitting rotational force is illustrated in FIG. 11. At the conversion apparatus, a rotational force is received 1101 from a motor output 30 having a first rotational speed, $F_1$. The first rotational force is transmitted 1102 to three engaging planetary gears 114 radially disposed about the motor output 30 and, then, the rotational force is transmitted 1103 from the engaging planetary gears 114 to three pinion planetary gears 128. Further, the rotational force is transmitted 1104 from the pinion planetary gears 128 to three walking planetary gears 142 where two of the three pinion planetary gears 128 engage each of the walking planetary gears 142. The walking planetary gears 142 are then rotated 1105 around a circumference of a ring gear 150 that is fixedly attached to a gear box housing 160 to produce a second rotational speed, $F_2$. Finally, the second rotational speed is transmitted 1106 to a carrier output shaft 106. In one illustrative operation, the second rotational speed $F_2$ is lower than the first rotational speed $F_1$. As can be seen in FIG. 7, the motor output shaft 30 provides a first rotational speed $F_1$, which is the converted via conversion apparatus 100, to the second rotational speed $F_2$ at the carrier output shaft 106.

Figure 8:
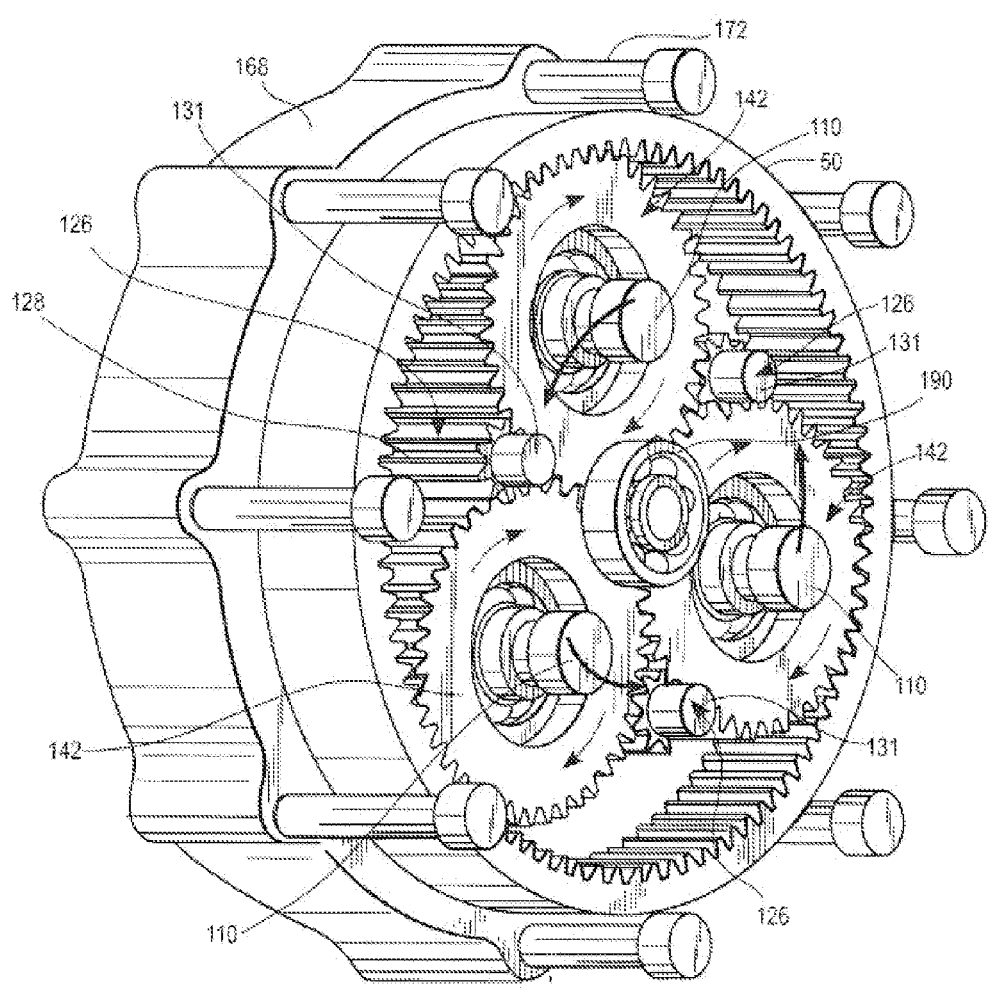
FIG. 8 comprises a front perspective view of the example apparatus of FIG. 3 with a carrier portion removed.
Figure 9:
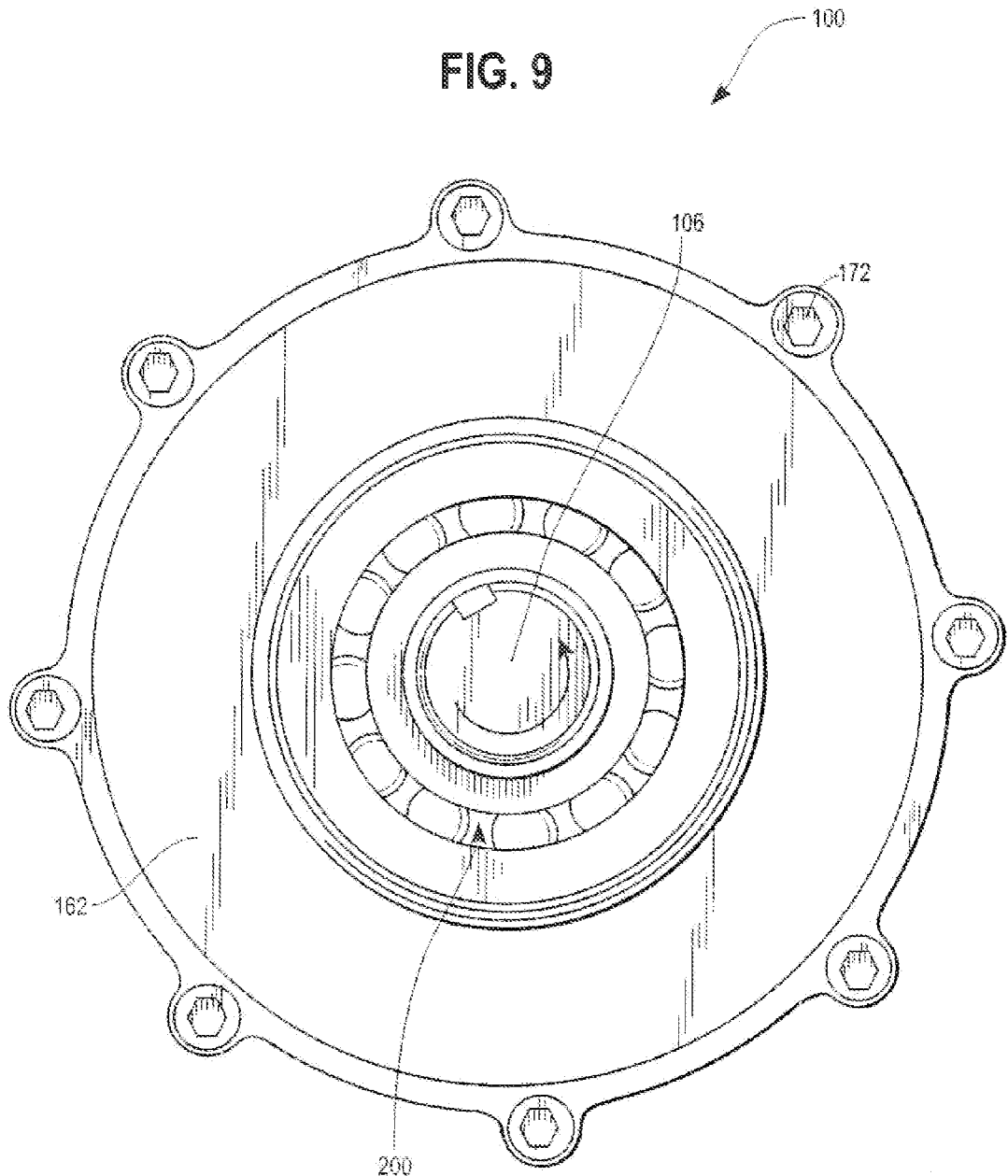
FIG. 9 comprises a front plan view of the example apparatus of FIG. 3.

To help illustrate the transmission of the rotational force, carrier output shaft 106 and carrier flange 124 have been removed from FIG. 8. As noted above, the rotational force is transferred from the three pinion planetary gears 128 (a portion of which are shown in FIG. 8) to the three walking planetary gears 142. As the walking planetary gears 142 travel around the circumference of the inner surface 154 of the ring gear 150, the carrier fasteners 110, which extend through the central openings 146, also move around the center axis 180 of the conversion apparatus 100, in a counterclockwise manner when viewed from the carrier flange 124.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. An apparatus comprising:
   three engaging planetary gears configured to engage an input drive;
   three pinion planetary gears, each of the pinion planetary gears configured to rotate with one of the engaging planetary gears;
   three walking planetary gears, each of the walking planetary gears engaging portions of two of the pinion planetary gears, the walking planetary gears having a central opening with bearings disposed therein;
   a carrier including an output shaft having a flange with apertures therein and a carrier plate;

a set of carrier fasteners extending through the apertures of the flange and the central opening of the walking planetary gears and into the carrier plate, the carrier fasteners fixedly engaging the flange and the carrier plate and the carrier fasteners rotatably engaging the walking planetary gears;

a ring gear having teeth disposed on an inner surface thereof, the teeth engaging the three walking planetary gears;

a gear housing including a front housing portion with a central opening therethrough and a rear housing portion;

housing fasteners configured to fixedly secure the front housing, the rear housing, and the ring gear relative to one another; and wherein the three walking planetary gears are configured to rotate and move within a circumference of the ring gear.

2. The apparatus of claim 1 wherein each of the engaging planetary gears defines internal engaging gear teeth configured to mesh with a plurality of pinion gear teeth of each of the three pinion planetary gears.

3. The apparatus of claim 1 wherein the front housing portion includes a first set of apertures and the rear housing portion includes a second set of apertures, wherein the first and second apertures are configured to receive housing fasteners to fixedly connect the first and second housing portions with the ring gear.

4. The apparatus of claim 1 wherein the output shaft of the carrier extends through the central opening of the front housing and the rear housing includes a rear opening through which the input drive extends.

5. The apparatus of claim 4 wherein the front housing portion further comprises a housing ridge and front housing bearings disposed between the housing ridge and the output shaft.

6. The apparatus of claim 1 wherein the rear housing portion has rear housing bearings disposed therein to provide a rotatable engagement between the carrier plate and the second housing portion.

7. The apparatus of claim 1 wherein the carrier plate further includes a central opening having bearings disposed therein, the central opening configured to rotatably engage the input drive.

8. The apparatus of claim 1 wherein the carrier plate further includes radially disposed openings having rear carrier bearings disposed therein, the radially disposed openings with the carrier bearings configured to engage the three pinion planetary gears.

9. The apparatus of claim 1 wherein the flange of the output shaft includes a central opening having bearings therein to provide a rotatable engagement with the input drive.

10. The apparatus of claim 1 wherein the carrier fasteners that extend through the apertures fixedly secure the output shaft and the carrier plate.

11. An apparatus configured to operably connect a motor to a movable barrier, the apparatus comprising:

a first gear set having first set gears configured to be radially disposed about a motor output shaft, the first gear set configured to receive rotational input from the motor output shaft;

a second gear set, each second gear set gear having a first portion engaging a center of one of the first set gears, the first gear set configured to rotate gears of the second gear set;

a third gear set, each third gear set gear engaging two of the second gear set gears, which are configured to rotate the third gear set gears, the third gear set gears each having an opening with bearings disposed therein;

a carrier having an output shaft and a flange with radially disposed apertures therein;

a rear carrier plate having a central opening therethrough and radially disposed openings;

carrier fasteners configured to fixedly attach the carrier output shaft to the rear carrier plate and the carrier fasteners configured to extend through the openings with bearings disposed therein;

an annulus gear with teeth engaging the third gear set gears; and a front housing with a central opening through which the output shaft extends, a rear housing defining a rear opening configured to receive the motor output shaft, and a set of housing fasteners configured to secure the front housing and rear housing around the first gear set, the second gear set, and the third gear set.

12. The apparatus of claim 11 wherein the annulus gear is fixedly attached to the front housing and the rear housing via friction.

13. The apparatus of claim 12 wherein the third gear set gears rotate and engage the annulus gear, which is fixedly attached to the front and rear housing thereby moving each of the third gear set gears along a circumference of the annulus gear and rotating the output carrier shaft, which is rotationally secured to the third gear set gears via the carrier fasteners.

14. An apparatus configured to convert the speed and torque of a motor output, the apparatus comprising:

first stage gears having first stage external teeth configured to engage a motor output;

second stage gears configured to rotate with the first stage gears, the second stage gears having second stage external teeth;

third stage gears having third stage openings and third stage external teeth engaging the second stage external teeth, the second stage gears configured to rotate the third stage gears; and a carrier having an output section with a flange having flange openings therethrough and a carrier plate having threaded openings therein;

carrier fasteners extending through the flange openings, and into the threaded openings of the carrier plate; and an annulus gear with fourth stage internal gear teeth engaging the third stage external gear teeth such that the third stage gears and annulus gear rotate relative to one another and to thereby rotate the carrier via the carrier fasteners;

wherein the second stage external teeth have a second stage face width that is at least as long as a combination of both a first stage face width of first stage internal teeth and a third stage face width of the third stage external teeth.

15. The apparatus of claim 14 wherein each first stage gear and a corresponding second stage gear have a common rotational axis.

16. The apparatus of claim 14 wherein the first stage gears further comprise the first stage internal gear teeth about a center opening and the first stage internal gear teeth engaging the second stage external teeth.

17. The apparatus of claim 14 further comprising:

a front housing with front apertures and a central opening through which the output section of the carrier may extend;

a rear housing with rear apertures and a central opening configured to receive the motor output; and housing fasteners configured to secure the front housing and the rear housing.

18. A method of transmitting rotational force, the method comprising:

receiving a rotational force from a motor output having a first rotational speed;

transmitting the first rotational force to three engaging planetary gears radially disposed about the motor output;

transmitting the rotational force from the three engaging planetary gears to three pinion planetary gears;

transmitting the rotational force from the three pinion planetary gears to three walking planetary gears, two of the three pinion planetary gears engaging each of the walking planetary gears;

rotating the walking planetary gears around a circumference of a ring gear that is fixedly attached to a gear box housing to produce a second rotational speed; and transmitting the second rotational speed to a carrier shaft output.

19. The method of claim 18 wherein the second rotational speed is lower than the first rotational speed.

20. An apparatus configured to convert the speed and torque of a motor output, the apparatus comprising:

first stage gears having first stage external teeth configured to engage a motor output;

second stage gears configured to rotate with the first stage gears, the second stage gears having second stage external teeth;

third stage gears having third stage openings and third stage external teeth engaging the second stage external teeth, the second stage gears configured to rotate the third stage gears; and a carrier having an output section with a flange having flange openings therethrough and a carrier plate having threaded openings therein;

carrier fasteners extending through the flange openings, and into the threaded openings of the carrier plate; and an annulus gear with fourth stage internal gear teeth engaging the third stage external gear teeth such that the third stage gears and annulus gear rotate relative to one another and to thereby rotate the carrier via the carrier fasteners;

wherein the first stage gears further comprise first stage internal gear teeth about a center opening and the first stage internal gear teeth engaging the second stage external teeth.

21. The apparatus of claim 20 wherein each first stage gear and a corresponding second stage gear have a common rotational axis.

22. The apparatus of claim 20 further comprising:

a front housing with front apertures and a central opening through which the output section of the carrier may extend;

a rear housing with rear apertures and a central opening configured to receive the motor output; and housing fasteners configured to secure the front housing and the rear housing.

23. An apparatus configured to convert the speed and torque of a motor output, the apparatus comprising:

first stage gears having first stage external teeth configured to engage a motor output;

second stage gears configured to rotate with the first stage gears, the second stage gears having second stage external teeth;

third stage gears having third stage openings and third stage external teeth engaging the second stage external teeth, the second stage gears configured to rotate the third stage gears; and a carrier having an output section with a flange having flange openings therethrough and a carrier plate having threaded openings therein;

carrier fasteners extending through the flange openings, and into the threaded openings of the carrier plate;

an annulus gear with fourth stage internal gear teeth engaging the third stage external gear teeth such that the third stage gears and annulus gear rotate relative to one another and to thereby rotate the carrier via the carrier fasteners;

a front housing with front apertures and a central opening through which the output section of the carrier may extend;

a rear housing with rear apertures and a central opening configured to receive the motor output; and housing fasteners configured to secure the front housing and the rear housing.

24. The apparatus of claim 23 wherein each first stage gear and a corresponding second stage gear have a common rotational axis.

* * * * *